(12) United States Patent
Sanders et al.

(10) Patent No.: US 6,532,546 B2
(45) Date of Patent: Mar. 11, 2003

(54) COMPUTER SYSTEM FOR DYNAMICALLY SCALING BUSSES DURING OPERATION

(75) Inventors: Michael C. Sanders, Spring, TX (US); B. Tod Cox, Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 10/099,420

(22) Filed: Mar. 15, 2002

(65) Prior Publication Data

US 2002/0099976 A1 Jul. 25, 2002

Related U.S. Application Data

(63) Continuation of application No. 09/250,050, filed on Feb. 12, 1999, now Pat. No. 6,449,729.

(51) Int. Cl.[7] .................................................. G06F 11/07
(52) U.S. Cl. .......................................... 714/4; 714/43
(58) Field of Search .......................... 714/1–6, 43, 712, 714/763.8, 14, 23; 710/100, 305; 711/100; 702/35, 185; 370/216, 242

(56) References Cited

U.S. PATENT DOCUMENTS

| | | | |
|---|---|---|---|
| 4,627,054 A | | 12/1986 | Cooper et al. ................. 371/11 |
| 4,634,110 A | | 1/1987 | Julich et al. ................... 371/11 |
| 4,787,082 A | * | 11/1988 | Delaney et al. |
| 5,195,046 A | * | 3/1993 | Geradi et al. |
| 5,404,465 A | * | 4/1995 | Novakovich et al. |
| 5,469,542 A | | 11/1995 | Foster et al. ........... 395/200.01 |
| 5,583,987 A | | 12/1996 | Kobayashi et al. ..... 395/182.11 |
| 5,610,792 A | | 3/1997 | DeShazo .................... 361/103 |
| 5,627,962 A | | 5/1997 | Goodrum et al. ....... 395/182.11 |
| 6,000,040 A | | 12/1999 | Culley et al. ................. 714/31 |
| 6,349,390 B1 | * | 2/2002 | Dell et al. |

* cited by examiner

*Primary Examiner*—Gopal C. Ray
(74) *Attorney, Agent, or Firm*—Fletcher, Yoder & Van Someren

(57) ABSTRACT

Apparatus and method are disclosed for down scaling performance of a multibus multiprocessor computer system. One or more busses associated with one or more failed processors or devices are disabled to allow operation from remaining busses. If errors or power failure are detected in a processor or bus device the computer system may reboot and, using the apparatus and method of the present invention, the bus associated with the defective processors or devices may be disabled upon reboot. The one or more affected busses may be disabled and the computer system may be brought back up in a single-bus operational mode or a multiple bus operational mode where an alternate bus is designated as the boot bus.

8 Claims, 5 Drawing Sheets

COMPUTER SYSTEM FOR DYNAMICALLY SCALING BUSSES DURING OPERATION

This application is a Continuation of Ser. No. 09/250,050 filed Feb. 12, 1999, now U.S. Pat. No. 6,449,729 entitled 'Computer System for Dynamically Scaling Busses During Operation' by Michael C. Sanders and Tod B. Cox, which issued on Sep. 10, 2002.

FIELD OF THE INVENTION

The present invention relates to bus scaling in multibus, multiprocessor environments. In particular, the present invention relates to scaling multiple or redundant busses in multiprocessor environments under various conditions.

BACKGROUND OF THE INVENTION

Many computer systems have taken advantage of the proliferation of high speed peripherals and corresponding demand for high capacity throughput by incorporating a dual bus or multibus architecture in a multiprocessor environment. Along with bus redundancy, processor and device redundancy allow greater levels of throughput to be achieved along with other advantages known to those skilled in the art.

When devices in multibus environment fail however, it is possible that an entire bus may be rendered unstable and thus unusable, and operations of the computer system may need to be shut down until defective devices can be replaced and the associated busses can be reactivated. In high end servers, for example, a huge number of tasks may be serviced by a single server making down time undesirable. It is often the case that servers supporting critical applications, particularly in the area of financial transactions, are intolerant to any server down time. Features such as hot pluggability of peripherals and the like have been developed to ensure that critical operations are maintained without bringing the system down when devices such as communications cards, disk drives and the like, are installed or removed. However with processors and other critical devices, serious problems arise when contemplating their installation or replacement without inhibiting system operation.

In an advance multibus multiprocessor environment, for example, tag RAMs coupled in most cases to each bus are used to provide cache coherency by storing cache address tags as is known and widely practiced in the art. However, when tag RAMs experience a failure such as a parity error, there is typically no error correction incorporated into the tag RAM. The only recourse available, when even a single tag RAM is found to contain errors, is to bring the system down. The system remains inoperable until the defective memory is replaced.

In addition it is possible that in a multiprocessor environment, a processor or its power supply, for example, may be defective. A defective processor may be unstable and may also require that the entire system be shut down since a failed processor cannot typically be reliably isolated from its bus. It may be possible for a failed processor in a particular failure mode to be tristated from its bus. However, it is not proven that, especially in the case of power loss, processor tristating can be guaranteed. Moreover, the probability is high that the failure mode involves the processor, for example, having undefined output or loss of power such that the bus will be affected. Such a failure mode may pull the bus voltage down or inundate the bus with a continuous stream of bad data. Reliable operations may not be guaranteed until the processor or power module is replaced and in most cases no system operation at all is possible.

While the above problems relate to the effect of device failure, including processor failure, on bus and system operation in a multibus, multiprocessor computer system, there are related problems associated with populating sockets or slots allocated for additional devices and processors while the system is in operation. Hot pluggability is a feature commonly required of peripherals but is generally reserved for slots which accept a circuit card. Hot pluggability of peripheral cards is possible due in part to the ability of the card to mechanically mate in a precise and predictable fashion allowing contacts to be made in an acceptable sequence for the application of power, ground, clock signals, and the like and to promote a known operational state to be attained by the peripheral when plugging is complete. Since processors, memory devices, and the like are not only more complicated than peripherals, but are often more sensitive to electrical anomalies such as static discharge, hot plugging such devices carries more risks and has not been possible. Moreover, the speed and complexity of a processor, raises the possibility that unless the processor or device is properly seated before it is prepared for operation, its state could be rendered indeterminate due to the smallest electrical irregularity or perturbation even if of a transient nature.

It would be desirable therefore for an apparatus and method for allowing the removal, installation, or replacement of a processor or device in a multi-bus, multiprocessor system. It would further be desirable for such a apparatus and method which would allow such removal, replacement, or installation while allowing operation of the computer system to be continued.

SUMMARY OF THE INVENTION

The present invention overcomes the above identified problems as well as other shortcomings and deficiencies of existing technologies by providing a apparatus and method for down scaling performance of a multibus multiprocessor system by disabling one or more busses in a multibus multiprocessor system associated with one or more inoperative, disabled, or uninstalled processors, or inoperative memory device on the affected one or more busses. The present invention further overcomes the problems identified with the prior art by allowing processors and critical devices to be plugged into an operating computer system and reactivating the associated bus when devices are successfully plugged in.

In a computer system with an architecture having two or more separate busses, there may be, for example, four processors on each bus providing built-in redundancy. Tag RAMS may further provide processors in the multiprocessor environment of the present invention with enhanced cache coherency. If, for example, one or more of the exemplary four processors or one of the tag RAMs associated with one bus is inoperative or uninstalled, the present invention allows the computer system to operate in a scaled-down performance mode on the remaining bus in a two bus system or remaining busses in a multibus system.

For example, if a parity error is detected in a processor tag RAM, the computer system may reboot and, using the apparatus and method of the present invention, the defective tag RAM may be disabled upon reboot. The one or more affected busses may be disabled and the computer system may be brought back up in a single-bus operational mode. Such an apparatus and method may be applied as a general-purpose recovery method for any dual-bus or multibus system wherein a critical failure state involving a processor or memory device may be detected and the computer system may be rebooted with the bus or busses corresponding to the affected processor or device being disable and limited operations may be sustained with one bus operational.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
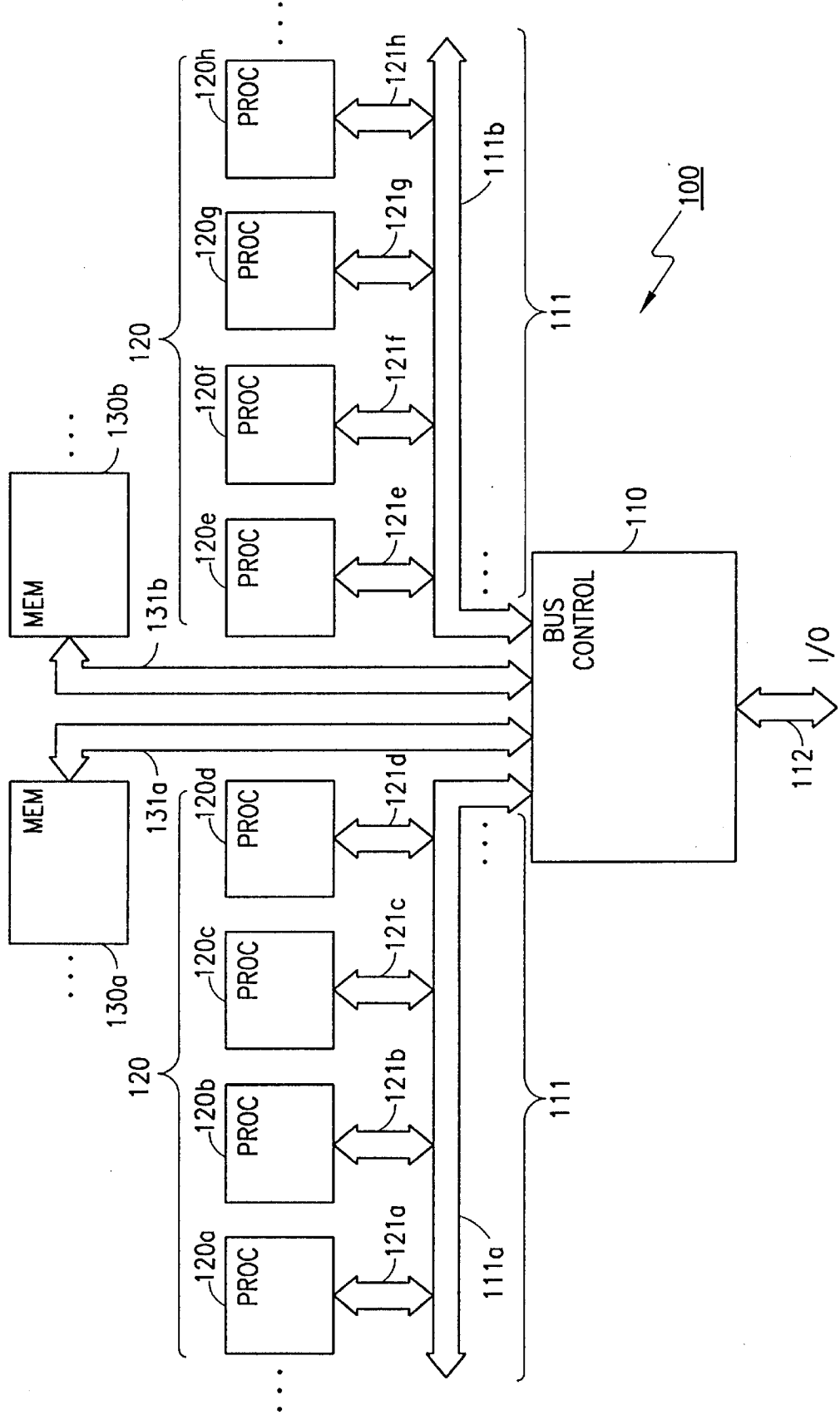
FIG. 1 is a block diagram illustrating an exemplary computer system having a multibus and multiprocessor architecture.

Referring to FIG. 1, a block diagram shows exemplary computer system 100 having multiple processors 120a–120h coupled to busses 111a and 111b either through bus buffers 121a–121h or directly to busses 111a and 111b. In the preferred embodiment of the present invention, one or more processors 120 may be present and, in particular, more or less than the eight processors 120a–120h may be present on one or more busses, as illustrated with exemplary busses 111a and 111b. Although two busses 111a and 111b are shown, more busses may be present in accordance with the present invention. Controller 110 may be used to manage bus activity on busses 111a and 111b and may further manage access between multiple processors 120a–120h and memory devices 130a and 130b. In the preferred embodiment of the present invention, memory devices 130a and 130b may be used to store address tags for maintaining cache coherency, as is known in the art, and may be high speed RAMs or like devices capable of fast access and data retrieval. Memory devices 130a and 130b may be accessed using busses 131a and 131b as shown in the diagram and controller 110. Controller 110 may be further coupled to additional resources including input devices such as keyboards, disk drives, additional memory, peripheral busses and associated devices, and through I/O bus 112. I/O bus 112 may be an input/output bus such as the PCI bus known in the art.

Figure 2A:
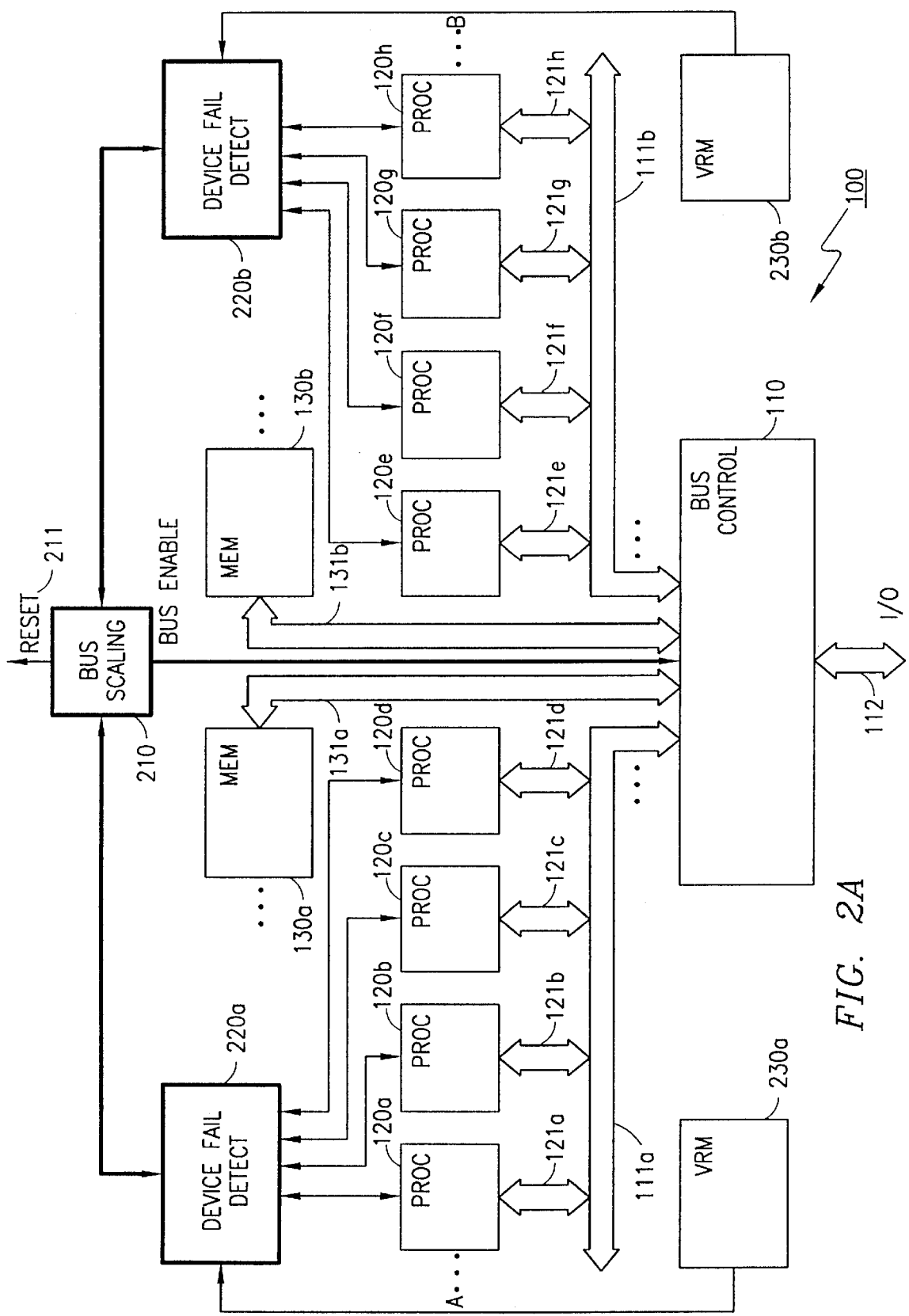
FIG. 2A is a block diagram illustrating an exemplary computer system having a multibus and multiprocessor architecture with bus scaling in accordance with the present invention.

Computer system 100, as illustrated in FIG. 1, can experience failure however if one or more of processors 120a–120h are inoperable. Moreover, if one of memory devices 130a and 130b fails due to, for example, a parity error, the associated bus and processors coupled to the associated bus along with computer system 100 will be inoperable in systems of the prior art. Accordingly, improved computer system 200 is illustrated in FIG. 2A having bus scaling in accordance with the present invention. Processors 120a–120h, memory devices 130a and 130b, and bus control 110, in accordance with the present invention, are supplemented with bus scaling logic 210 and device failure detectors 220a and 220b. In t he preferred embodiment, the present invention may be included in a chipset, external circuits, operating system software, or may otherwise be integrated into computer system 200 in a manner known in the art.

Figure 2B:
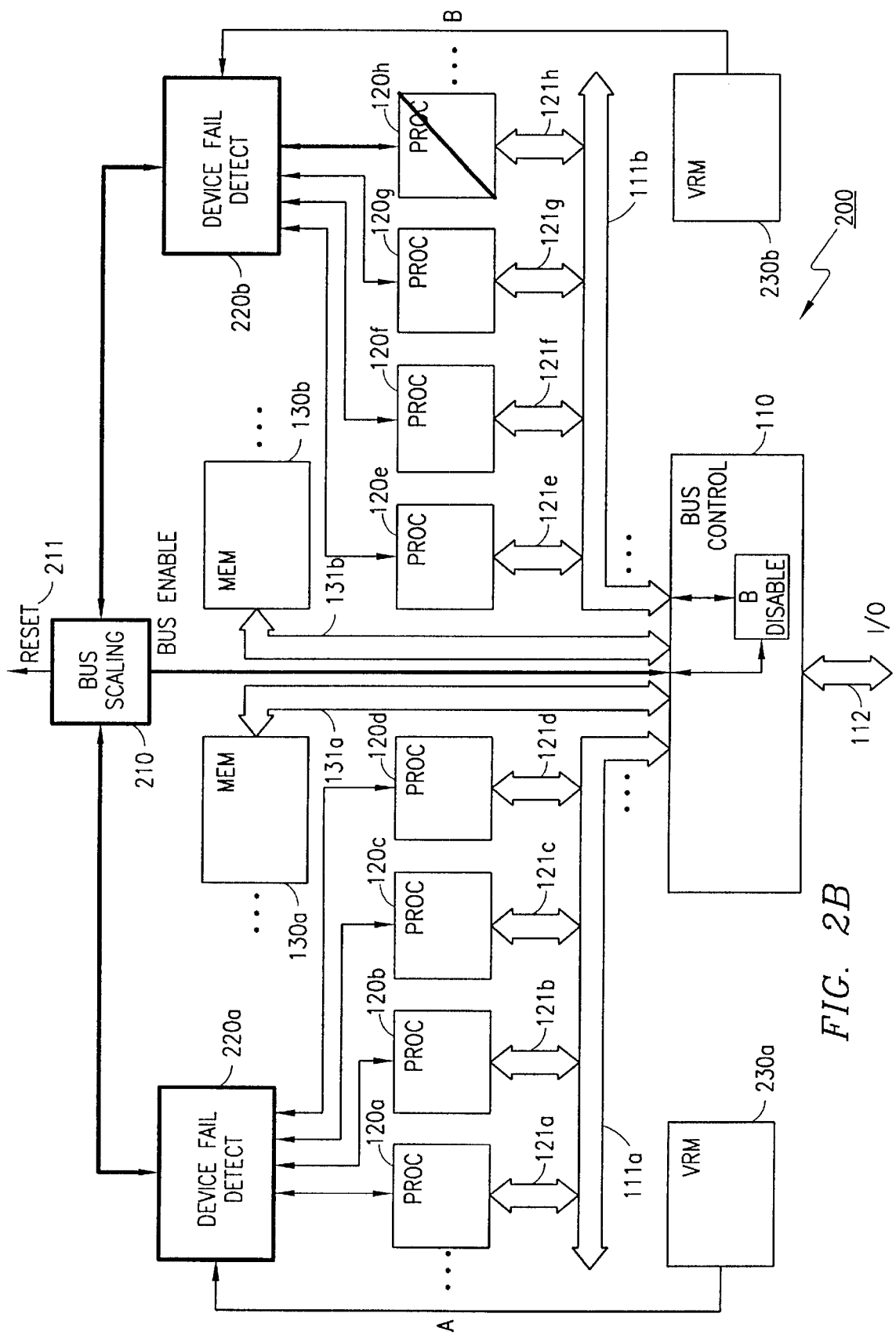
FIG. 2B is a block diagram illustrating an exemplary computer system having a multibus and multiprocessor architecture with bus scaling in accordance with the present invention with a bus disabled.
Figure 2C:
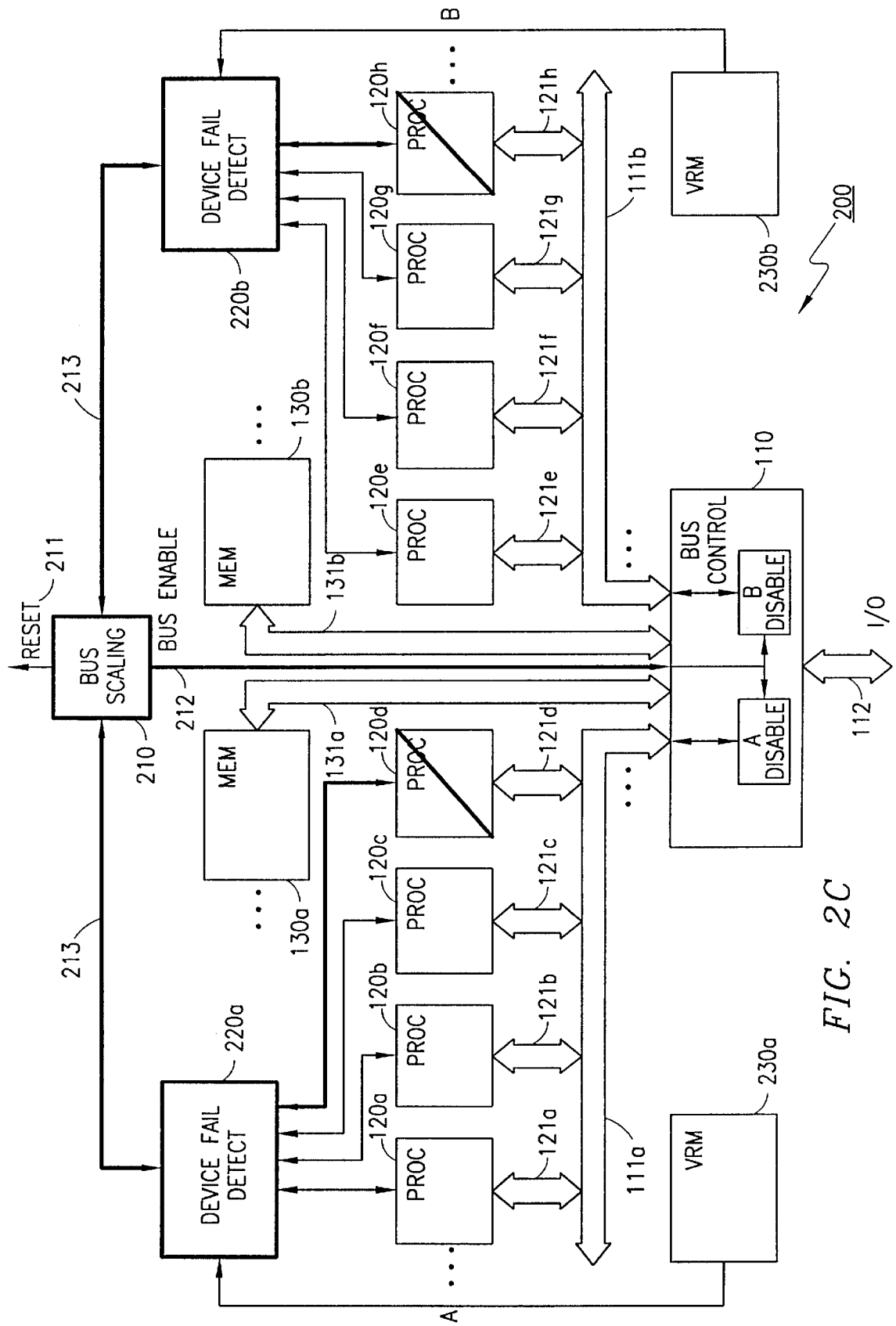
FIG. 2C is a block diagram illustrating an exemplary computer system having a multibus and multiprocessor architecture with bus scaling in accordance with the present invention with two busses disabled.

Failure detectors 220a and 220b may detect one or more failure modes which would cause computer system 200 to otherwise become inoperable. As is shown in FIG. 2B, a basic failure mode which may be detected in failure detectors 220a and 220b is the power failure mode of one or more processors 120a–120h. If a power failure is detected on any processor 120a–120h when computer system 200 is turned on, for example processor 120h is shown as experiencing a failure, the system will automatically disable the associated bus 111b and the unaffected bus 111a will remain enabled. FIG. 2C illustrates that more than one bus 111 may be affected by a failure, for example, processor 120d and 120h are shown to be experiencing a failure mode, thus affecting busses 111a and 111b. Both busses 111a and 111b will be disabled as shown and bus scaling logic 210 will hold the system reset by outputting and holding a reset signal on reset line 211. Computer system 200 will reboot as long as one or more busses 111 remain unaffected. To avoid a situation where, one of bus 111 is disabled and an alternate bus 111 is unpopulated, it would be preferable in the preferred embodiment of the present invention to alternate busses 111 as processors 120 are added to ensure that at least one alternate bus 111 with one or more processors 120 is available. Further, as previously described it is preferable to couple processors 120 to bus 111 using bus buffers 121 which may be tristated upon failure of the associated processor. In such a case, it would be possible for the associated bus 111 to be operative as long as the affected processor 121 was reliably isolated from bus 111 by bus buffer 121 as will be described in greater detail hereinafter.

While power failure may be a common failure mode detected by failure detector 220a and 220b, as described above, it is possible that other failure modes may be detected by failure detector 220a and 220b. It is possible, for example, that memory device 130a or 130b may fail due to a parity error and the like. If a parity error is detected in memory device 220a or 220b, cache coherency may be severely compromised and the associated bus must be disabled. As described above, as long as one or more busses 111 remain unaffected by a failure in one or more memory devices 130, computer system 200 may be rebooted with the affected bus disabled.

Another advantages of the present invention that becomes clear to one skilled in the art using the teachings of the present invention is the possibility of accommodating the "hot plugging" of processors 120. Hot plugging refers to installing devices without removing power from the system. The advantages of hot plugging peripherals, for example, are well known. However, in the prior art, hot plugging of processors in a multibus, multiprocessor environment has not been possible for a variety of reasons including device and bus complexity, the ability of the device itself to withstand overcurrents and like electrical anomalies caused during the interval before pins are securely seated in respective sockets.

In the preferred embodiment of the present invention, a processor 120 may be hot plugged by bringing the associated bus 111 down, e.g. suspend processing operations over bus 111, powering down the associated bus 111, adding one or more processors 120 on associated bus 111, then bringing associated bus 111 back up into operation with one or more processors 120 powered and initialized. To accomplish the hot plugging of one or more processors 120 however, the operating system associated with computer system 200 would require modifications to allow processors 120 to be added and removed out of the processing task que as required. It is further desirable that, due to the possibility that one or more of processors 120 may nonetheless be inoperative after hot plugging, bus buffers 121a–121h may be configured such that if one or more of the hot plugged processors 120 loses power or comes up in an undefined state, bus buffers 121a–121h may be tristated to reliably insulate the inoperative processor 120 from bus 111. Accordingly, it would be possible to leave one or more unpowered processors 120 on bus 111 and not compromise the operation of computer system 200. As previously described, the operating system of computer system 200 would require modifications to ensure that if one or more of inoperative processors 120 was expected to come on line and is instead tristated, that appropriate measures may be taken to continue operation without the inoperative processor 120.

Figure 2D:
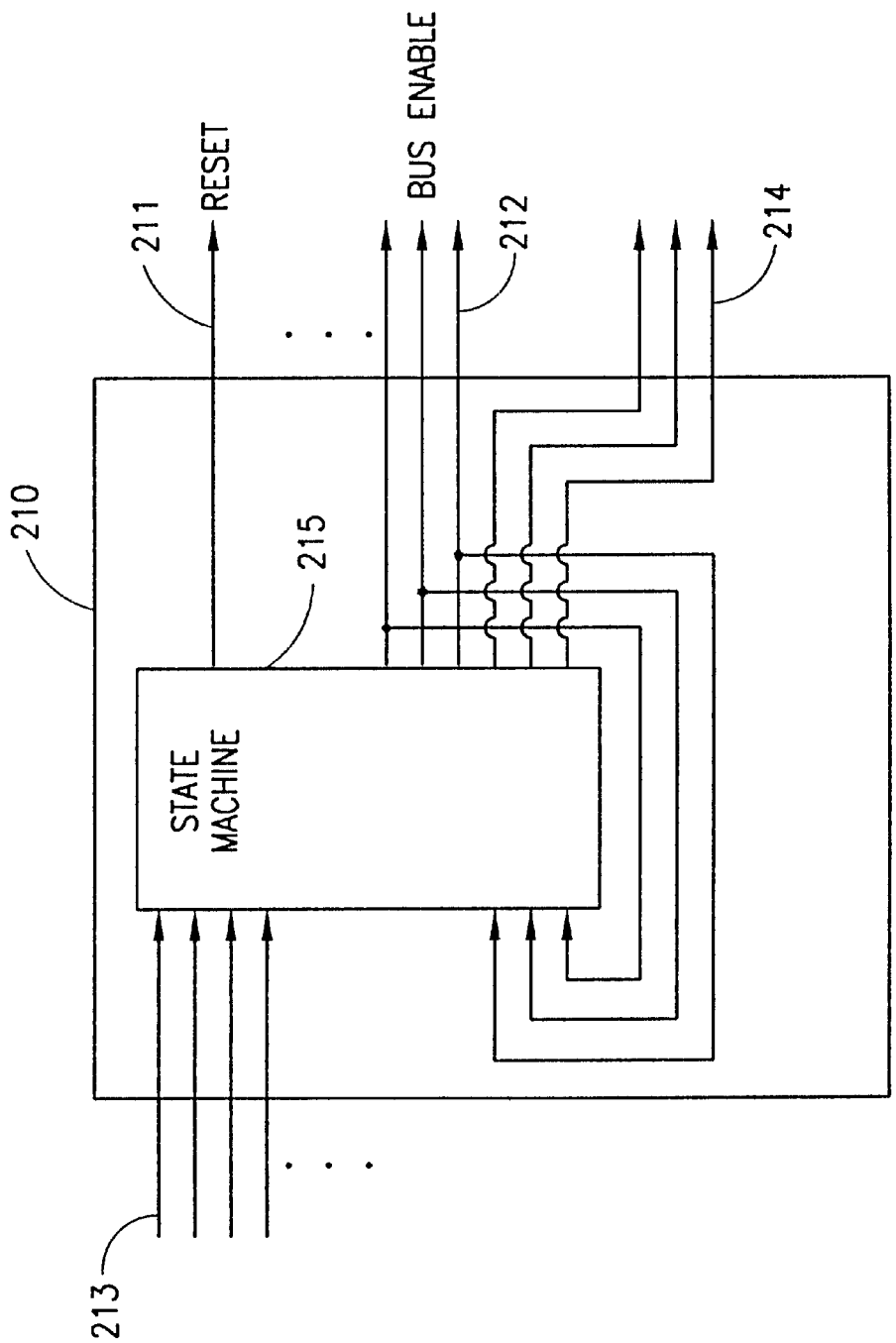
FIG. 2D is a schematic diagram illustrating an exemplary state machine in an exemplary bus scaling logic circuit in accordance with the present invention.

In accordance with the present invention a failure mode is detected by failure detectors 220a and 220b indicating an error associated with one or more of processors 120a–120h, and the associated with one or more of busses 111a or 111b. As can be seen in FIG. 2D, State machine 215 in bus scaling logic 210 may jump to a state where computer system 200 will be reinitialized with a number of busses 111 enabled by bus enable lines 212 set at "X" minus the number of failed busses 111 provided at least one bus 111 is operative. Remaining processors 120a–120h may be started, the operating system may be rebooted so that the inoperative processors 120 are not "seen" by the operating system. It is possible within bus control logic 210 to output signals at bus enable lines 212 indicating which busses are active. It is further possible to indicate using, for example, output lines 214 which bus is the boot bus. Bus enable lines 212 and output lines 214 may be controlled in state machine 215 which may be programmed using software or using, for example, Programmable Array Logic PAL or the like as is known in the art. Bus control logic 210 may be further configured to respond to the loss of power in one or more processors 120a–120h during operation by asserting a reset signal on reset line 211. After a predetermined time period the reset signal will be removed from reset line 211, computer system 200 will be restarted with bus control logic 210 indicating which busses 111 are active using bus enable lines 212 and which bus 111 to boot from using, for example, output lines 214. Accordingly it becomes clear to one of skill in the art that the present invention may be extended to allow a user accessible software interface for selectively disabling a bus 111 during operation, installing or replacing a processor 120, then restarting the bus without affecting operations already in progress on other busses 111 in the system.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for controlling the operation of two or more buses in a computer system having one or more processors, the method comprising the acts of:

detecting one or more failure modes associated with at least one of the two or more buses;

generating a failure signal responsive to the act of detecting, the failure signal corresponding to the one or more failure modes;

issuing a reset signal to reset the computer system with the at least one of the two or more buses disabled; and restarting the computer system responsive to the reset signal using a remaining one or more busses enabled and a predetermined one of the remaining one or more busses being designated a boot bus.

2. The method of claim 1, wherein the act of detecting one or more failure modes comprises the act of detecting a power failure of one or more of the plurality of processors.

3. The method of claim 1, wherein the act of detecting one or more failure modes comprises the act of detecting a memory error on one or more memory devices.

4. The method of claim 1, wherein the act of detecting one or more failure modes comprises the act of detecting a bus error on one or more of the two or more buses.

5. A method for controlling the operation of one or more buses in a computer system having one or more processors, the method comprising:

detecting a failure mode in one or more devices coupled to the one or more buses;

selectively disabling the one or more busses in response to the act of detecting a failure mode; and resetting the computer system with the one or more buses being disabled.

6. The method of claim 5, wherein the act of detecting a failure mode comprises the act of detecting a power failure of one or more of the one or more processors.

7. The method of claim 5, wherein the act of detecting a failure mode comprises the act of detecting a memory error on one or more memory devices.

8. The method of claim 5, wherein the act of detecting one or more failure modes comprises the act of detecting a bus error on one or more of the two or more buses.

* * * * *